United States Patent

Tanaka

[11] Patent Number: 5,779,270
[45] Date of Patent: Jul. 14, 1998

[54] SHOULDER ANCHOR STRUCTURE

[75] Inventor: Hideki Tanaka, Aichi-ken, Japan

[73] Assignee: Kabushiki Kaisha Tokai-Rika-Denki-Seisakusho, Aichi-ken, Japan

[21] Appl. No.: 689,243

[22] Filed: Aug. 7, 1996

[30] Foreign Application Priority Data

Sep. 13, 1995 [JP] Japan ................................ 7-235808

[51] Int. Cl.$^6$ ................................................ B60R 22/00
[52] U.S. Cl. .............................................. 280/808; 280/751
[58] Field of Search ........................... 280/801.1, 808, 280/751

[56] References Cited

U.S. PATENT DOCUMENTS

| | | | |
|---|---|---|---|
| 5,433,478 | 7/1995 | Naruse | 280/751 |
| 5,529,344 | 6/1996 | Yasui et al. | 280/808 |
| 5,593,182 | 1/1997 | Frost | 280/751 |

FOREIGN PATENT DOCUMENTS

| | | |
|---|---|---|
| 2660264 | 4/1990 | France . |
| 2660264 | 10/1991 | France . |
| 3022718 | 12/1981 | Germany . |
| 3742233 | 7/1989 | Germany . |
| 3844569 | 11/1989 | Germany . |
| 7149204 | 6/1995 | Japan . |
| 7156750 | 6/1995 | Japan . |
| 7172265 | 7/1995 | Japan . |

*Primary Examiner*—Kenneth R. Rice
*Attorney, Agent, or Firm*—Sixbey Friedman Leedom & Ferguson; Thomas W. Cole

[57] ABSTRACT

A shoulder anchor structure having: a slip joint disposed at a vehicle inner side of a side wall of a vehicle, and supporting a longitudinal direction intermediate portion of a webbing for restraining a vehicle occupant; and an anchor bolt fixed to the side wall in a state of passing through the slip joint, and supporting the slip joint, the shoulder anchor structure featuring: a slip joint cover fixed to the slip joint with a predetermined gap being formed between the slip joint cover and a vehicle inner side direction end portion of the anchor bolt so as to cover at least the vehicle inner side direction end portion of the anchor bolt, the slip joint cover deforming due to load from a vehicle inner side so as to absorb the load; and a garnish disposed between the side wall and the slip joint with a predetermined gap being formed between the garnish and the side wall, the garnish deforming due to load from the slip joint so as to absorb the load. Accordingly, load applied from the vehicle inner side to the slip joint cover is absorbed both by the slip joint cover and by the garnish.

26 Claims, 11 Drawing Sheets

SHOULDER ANCHOR STRUCTURE

BACKGROUND OF THE INVENTION

1. Field of the Invention

The present invention relates to a shoulder anchor structure which supports, at the upper portion of a side wall of a vehicle, a webbing for restraining a vehicle occupant.

2. Description of the Related Art

In a seat belt device for restraining a vehicle occupant, e.g., a three-point-type seat belt device for a front seat vehicle occupant, one end of a webbing is wound in layers by a take-up device disposed at the lower portion of the center pillar portion of the vehicle, and is accommodated in the take-up device. The other end of the webbing is fixed by an anchor plate which is fixed to the lower portion of the center pillar portion. A shoulder anchor is provided at a heightwise direction intermediate portion of the center pillar portion. The longitudinally intermediate portion of the webbing is inserted through a slip joint of the shoulder anchor, and is doubled back. A portion of the webbing between the slip joint and the anchor plate is inserted through a tongue plate which can be engaged with and separated from a buckle device which is provided upright at the side of the vehicle occupant front seat at the center of the vehicle interior.

In this type of seat belt device, the body of a vehicle occupant seated on a vehicle seat is restrained by the webbing due to the vehicle occupant grasping the tongue plate and engaging the tongue plate with the buckle device. If the vehicle suddenly decelerates in a state in which the webbing is applied to a vehicle occupant, the body of the vehicle occupant is restrained by the webbing. Therefore, the sudden deceleration acting on the body of the vehicle occupant can be reduced, and a secondary impact or the like caused by inertial force can be prevented.

With the webbing applied to the vehicle occupant, there is the possibility that the body of the vehicle occupant will be moved toward the rear of the vehicle by the inertial force at the time of the sudden deceleration of the vehicle and will contact the shoulder anchor of the seat belt device. If the body of the vehicle occupant does contact the shoulder anchor in this case or in other cases as well, it is preferable that the load acting on the body of the vehicle occupant is mitigated as much as possible. Such a shoulder anchor structure which can reduce the load has been greatly desired.

SUMMARY OF THE INVENTION

In view of the aforementioned, an object of the present invention is to provide a shoulder anchor structure in which, when the body of a vehicle occupant contacts the shoulder anchor structure, the load acting on the body of the vehicle occupant can be reduced.

The shoulder anchor structure of the first aspect has: a slip joint disposed at a vehicle inner side of a side wall of a vehicle, and supporting a longitudinal direction intermediate portion of a webbing for restraining a vehicle occupant; and an anchor bolt fixed to the side wall in a state of passing through the slip joint, and supporting the slip joint, the shoulder anchor structure comprising: a slip joint cover fixed to a vehicle inner side of the slip joint with a predetermined gap being formed between the slip joint cover and a vehicle inner side direction end portion of the anchor bolt so as to cover at least the vehicle inner side direction end portion of the anchor bolt, the slip joint cover deforming due to load from a vehicle inner side so as to absorb the load; and a garnish disposed between the side wall and the slip joint with a predetermined gap being formed between the garnish and the side wall, the garnish deforming due to load from the slip joint so as to absorb the load.

In the above-described shoulder anchor structure, when, for example, the body of a vehicle occupant moves toward the slip joint due to inertial force at the time the vehicle suddenly decelerates or the like and the body-of the vehicle occupant contacts the slip joint cover, the slip joint cover is deformed by the load at the time of contact. Here, because a predetermined gap is formed between the slip joint cover and the vehicle inner side direction end portion of the anchor bolt, in this state, the slip joint cover deforms up to the time that the slip joint cover contacts the anchor bolt, and the load is absorbed by the slip joint cover. As a result, the load acting on the body of the vehicle occupant can be effectively reduced.

When the slip joint cover presses the slip joint due to this load, the garnish is pushed by the slip joint. There is a predetermined gap between the garnish and the side wall. Further, the garnish is deformed due to a predetermined load. Therefore, in this state, the garnish deforms due to the load from the slip joint, and the load is absorbed by the garnish. As a result, the load acting on the body of the vehicle occupant can be decreased even more effectively.

In the second aspect of the present invention, in the first aspect, the slip joint cover has a rigidity increasing means for increasing rigidity with respect to load from the vehicle inner side in a case in which the slip joint cover receives load of a predetermined value or greater from the vehicle inner side. In this second aspect, the rigidity increasing means is, for example, a rib which extends from the slip joint side surface of the slip joint cover toward the slip joint and whose distal end portion is separated from the slip joint by a predetermined distance. Accordingly, when the slip joint cover deforms by that predetermined distance toward the slip joint, e.g., when the slip joint cover receives a load of the predetermined value or greater, the distal end portion of the rib abuts the slip joint, and the rigidity with respect to load applied to the slip joint cover in the direction of the slip joint increases.

The rib may be a cylindrical rib, or may be projecting ribs which are provided in an annular arrangement and separated by predetermined distances. The rib(s) can be disposed at the slip joint cover so as to surround the anchor bolt when the distal end portion of the rib abuts the slip joint.

In the shoulder anchor structure of the third aspect of the present invention, respective rigidities, with respect to pushing force from the vehicle inner side, of a first region of the slip joint cover, which substantially opposes the vehicle inner side direction end portion of the anchor bolt, and a second region of the slip joint cover, which is provided at a periphery of the first region, are lower than rigidities of other regions of the slip joint cover, and the first region and the section region are curved toward the vehicle outer side in a concave configuration due to load from the vehicle inner side.

In the shoulder anchor structure of the above-described aspect, the rigidities of the first region and the second region are set to be lower than the rigidities of the other regions. Therefore, when the body of the vehicle occupant contacts the slip joint cover and the slip joint cover is pushed, the slip joint cover, and mainly the first region and the second region, curves toward the vehicle outer side in a concave configuration along the configuration of the body of the vehicle occupant which contacts the slip joint cover and mainly the first region and the second region. In this way, the surface pressure at the time the vehicle occupant contacts the slip joint cover is effectively decreased, and the load acting on the body of the vehicle occupant can be decreased even more effectively.

In the shoulder anchor structure of the fourth aspect, in the third aspect, the rigidities of the other regions are set to be higher than the rigidities of the first region and the second region due to the rib which extends toward the slip joint and abuts the slip joint. More specifically, in the fourth aspect, the distal end portion of the rib is set in advance in a state of abutting the slip joint, which is different from the second aspect. Accordingly, the rigidities of the other regions with respect to load from the vehicle inner side are made large in advance as compared with the rigidities of the first region and the second region.

Further, in each of the above-described aspects, the region of the slip joint cover which substantially opposes the vehicle inner side direction end portion of the anchor bolt may be thicker than the other regions of the slip joint cover, or may be formed in two layers with an air layer therebetween. Due to these structures, the buffering force at the time of a collision with the aforementioned opposing region can be increased.

The fifth aspect of the present invention is a shoulder anchor structure having: a slip joint disposed at a vehicle inner side of a side wall of a vehicle, and supporting a longitudinal direction intermediate portion of a webbing for restraining a vehicle occupant; and an anchor bolt fixed to the side wall in a state of passing through the slip joint, and supporting the slip joint, the shoulder anchor structure comprising: a garnish upper at which at least one rib extending in a direction of opposing the side wall is formed, the garnish upper covering a vehicle inner side direction end portion of the anchor bolt from an upper side of a vehicle with a predetermined gap being formed between the vehicle inner side direction end portion of the anchor bolt and the garnish upper, and the garnish upper deforming due to load from a vehicle inner side so as to absorb the load; and a garnish lower at which at least one rib extending in a direction of opposing the side wall is formed, the garnish lower being disposed such that at least one portion of the garnish lower is positioned between the slip joint and the side wall from a vehicle lower side of the anchor bolt with a predetermined gap being formed between the side wall and the garnish lower, and the garnish lower deforming due to load from the vehicle inner side so as to absorb the load.

In the shoulder anchor structure of the fifth aspect, when, for example, the body of a vehicle occupant moves toward the slip joint due to inertial force at the time the vehicle suddenly decelerates or the like and the body of the vehicle occupant contacts the garnish upper, the garnish upper deforms due to the load at the time of contact. Here, because predetermined gaps are formed between the garnish upper and the side wall and between the garnish upper and the vehicle inner side direction end portion of the anchor bolt, in this state, the garnish upper deforms due to the load from the vehicle occupant until the time that the garnish upper contacts the anchor bolt, and the load is absorbed by the garnish upper.

When the garnish upper is pushed by the vehicle occupant, the at least one rib formed at the garnish upper deforms due to the load from the vehicle occupant, and the load is absorbed due to this deformation as well. Therefore, the load acting on the body of the vehicle occupant can be reduced effectively.

When the pushed garnish upper and at least one rib push the slip joint, the slip joint pushes the garnish lower, and the garnish lower deforms due to this load. Here, because a predetermined gap is formed between the garnish lower and the side wall, in this state, the garnish lower deforms due to the load from the slip joint up to the time that the garnish lower contacts the side wall, and the load is absorbed by the garnish lower. Further, when the garnish lower is pushed by the slip joint, the at least one rib formed at the garnish lower deforms due to the load from the slip joint, and the load is absorbed due to this deformation as well. As a result, the load acting on the body of the vehicle occupant can be reduced even more effectively.

In the shoulder anchor structure of the sixth aspect, a fixed portion of the side wall is deformable, and the fixed portion deforms due to the load from the anchor bolt such that the side wall absorbs the load.

In the shoulder anchor structure of the above-described sixth aspect, when the vehicle occupant contacts and pushes the garnish upper and the slip joint cover, the anchor bolt is pushed by the garnish upper and the slip joint cover. Here, when load is applied to the anchor bolt and the side wall is pushed by the anchor bolt, the fixed portion of the side wall deforms due to this load, and the load is absorbed by the side wall. As a result, the load which the body of the vehicle occupant receives from the anchor bolt via the garnish upper and the slip joint cover can be effectively reduced.

The shoulder anchor structure of the seventh aspect has a sleeve into which the anchor bolt is inserted such that the sleeve is positioned at the periphery of the anchor bolt, and the sleeve holds the slip joint at a predetermined position in an ordinary state, and the sleeve deforms due to load from the slip joint so as to absorb the load.

In the shoulder anchor structure of the above-described seventh aspect, the anchor bolt is inserted in the sleeve, and in an ordinary state, the slip joint is held at a predetermined position by the sleeve. Here, when the vehicle occupant contacts and presses the garnish upper and the slip joint cover, the slip joint is pushed by the garnish upper and the slip joint cover. When the slip joint pushes the sleeve due to the load, the sleeve deforms due to the load and absorbs the load. As a result, the load which the body of the vehicle occupant receives from the slip joint via the garnish upper and the slip joint cover can be effectively decreased.

DESCRIPTION OF THE PREFERRED EMBODIMENTS

Figure 1:
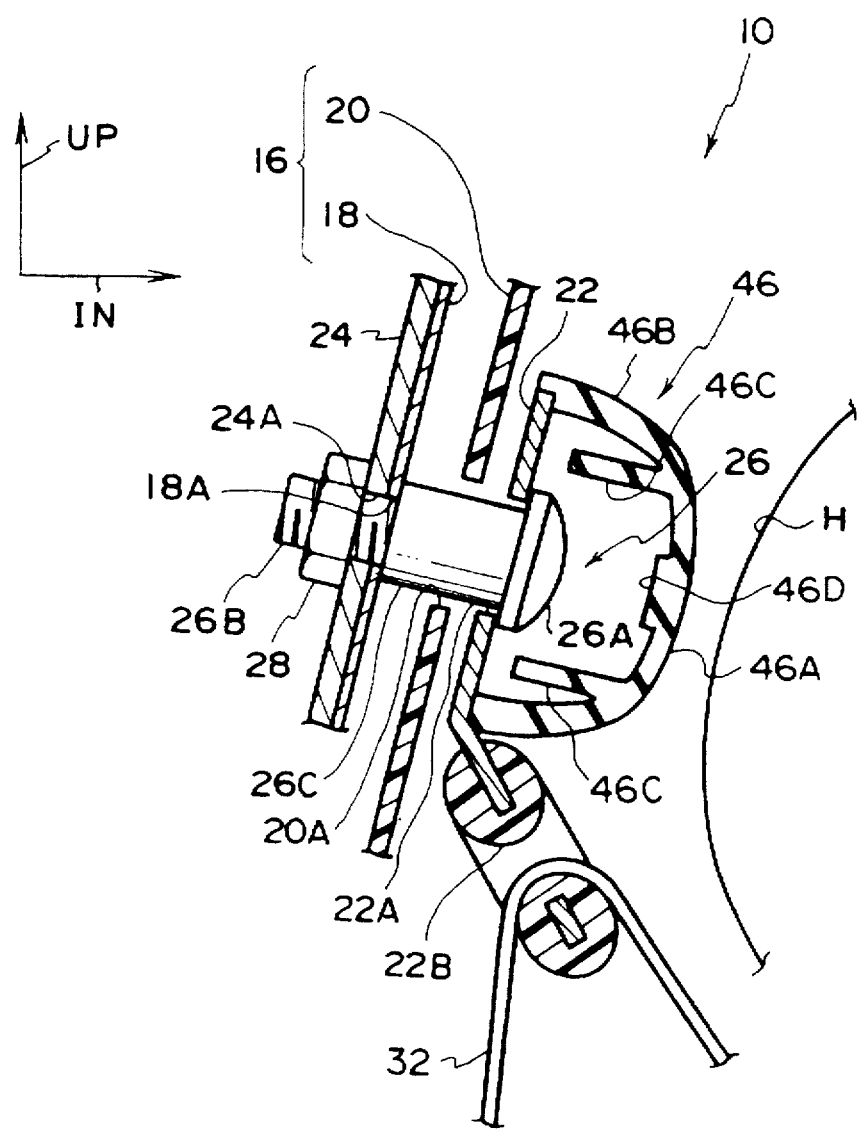
FIG. 1 is a front sectional view illustrating a shoulder anchor relating to a first embodiment of the present invention.
Figure 2:
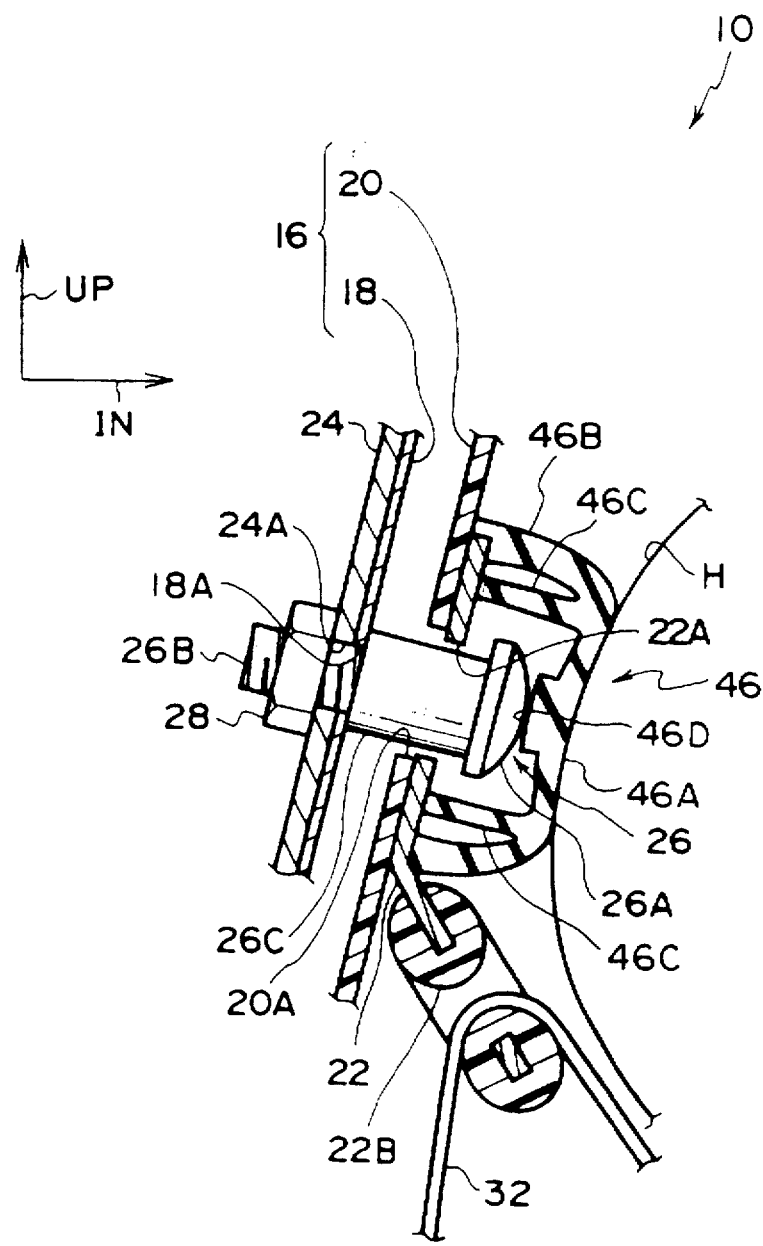
FIG. 2 is a front sectional view corresponding to FIG. 1 and illustrating a state in which the head of a vehicle occupant collides with a slip joint cover.
Figure 3:
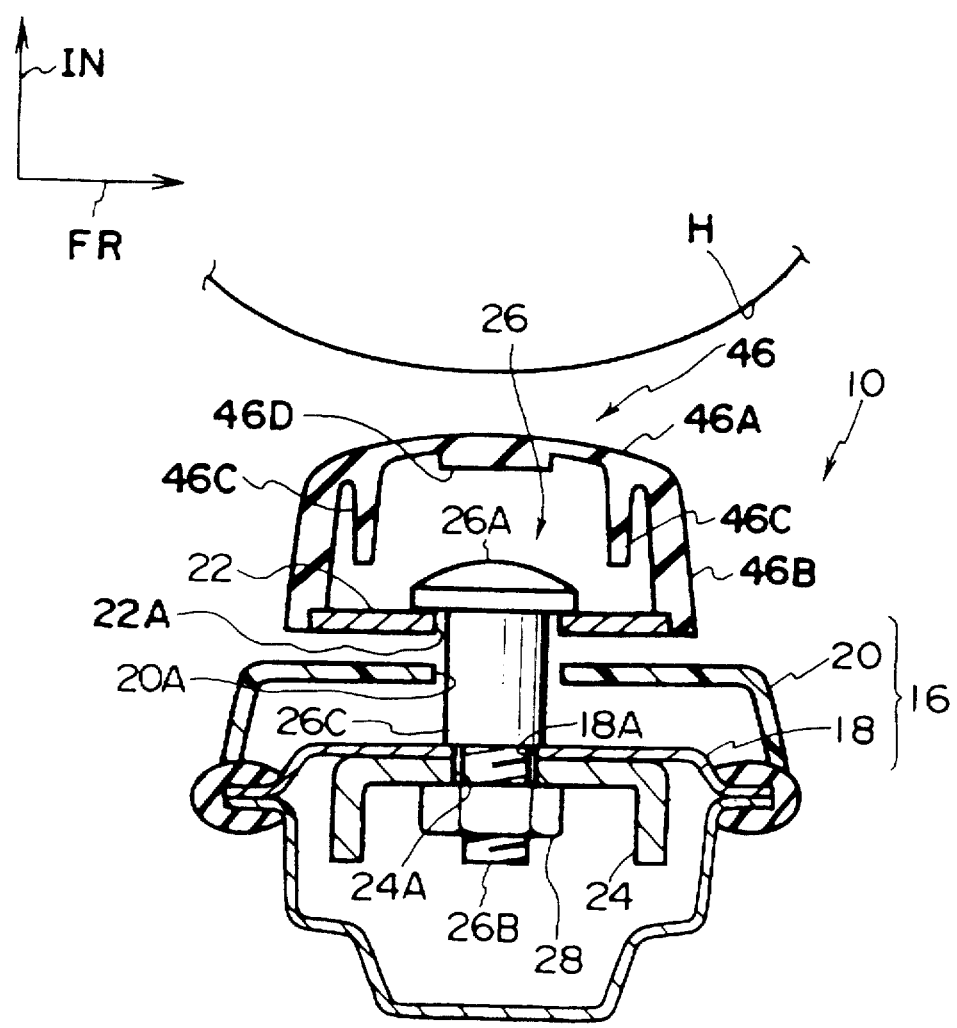
FIG. 3 is a top sectional view corresponding to FIG. 1.
Figure 4:
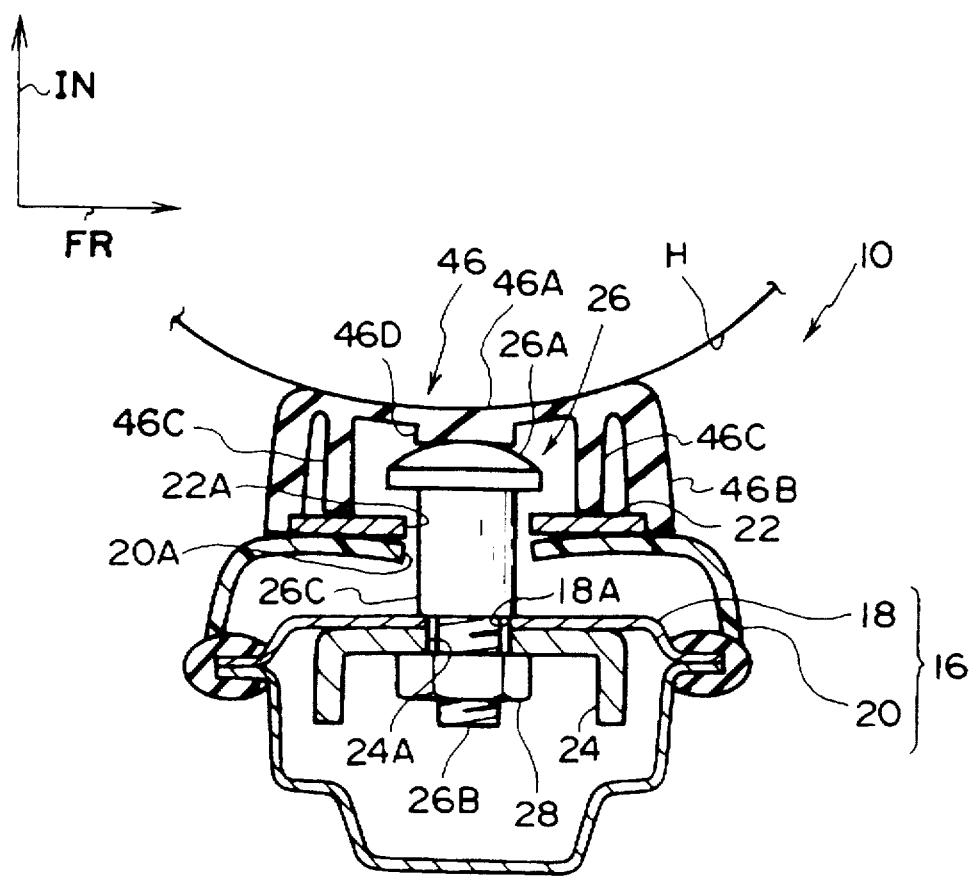
FIG. 4 is a top sectional view corresponding to FIG. 2.
Figure 5:
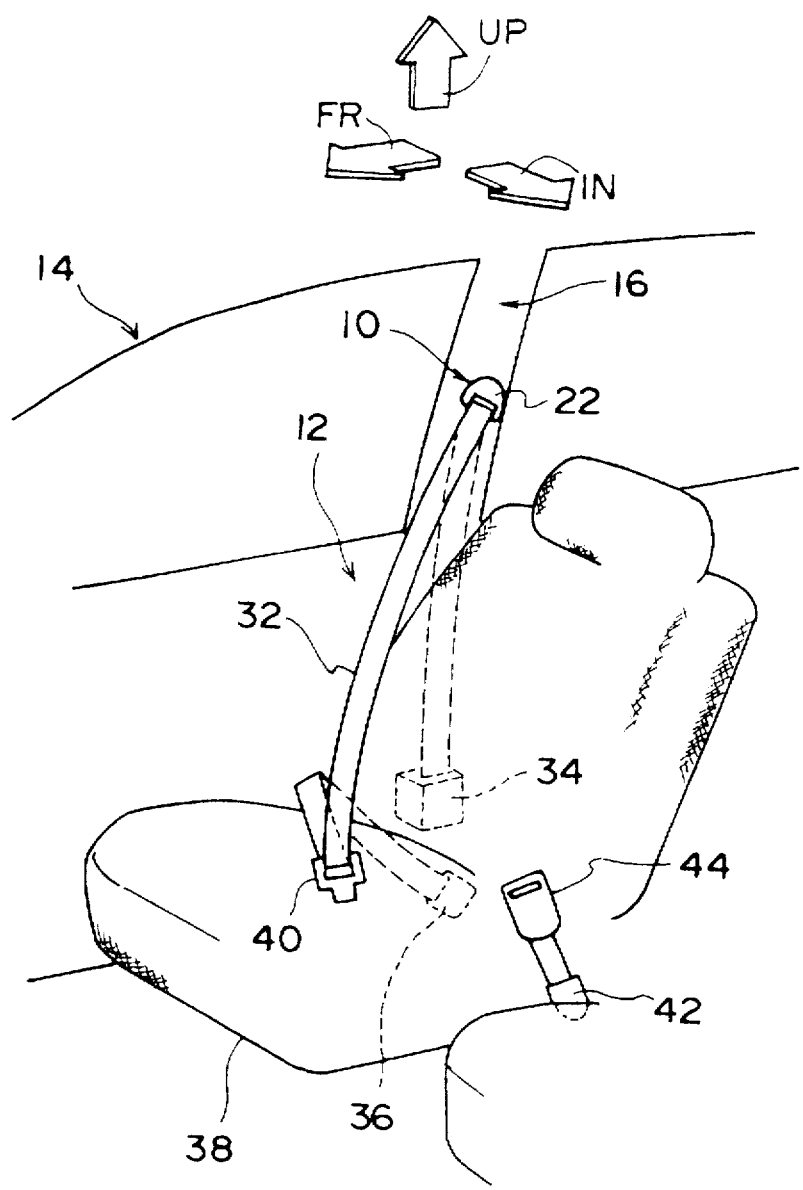
FIG. 5 is a view illustrating a place for setting the shoulder anchor illustrated in FIG. 1.

Hereinafter, a shoulder anchor 10 relating to a first embodiment of the present invention will be described on the basis of FIGS. 1 through 5. In the drawings, the arrow FR points toward the front of the vehicle, the arrow UP points toward the top of the vehicle, and the arrow IN points toward the interior of the vehicle.

As can be seen in the drawings, the shoulder anchor 10 is provided at a heightwise direction (the direction of arrow UP in FIGS. 1 through 5) intermediate portion of a center pillar portion 16 of a vehicle 14, and forms a portion of a three-point-type seat belt device 12.

The center pillar portion 16 is formed by a side wall 18 and a garnish 20 which is disposed at the vehicle inner side of the side wall 18. The side wall 18 is formed by a metal plate such as a steel plate, and forms a portion of the body of the vehicle 14.

The garnish 20 is formed of a resin material such as polyvinyl chloride or the like, and is disposed such that a predetermined gap is formed between the side wall 18 and the garnish 20. By providing the garnish 20, the design of the vehicle interior improves, and the side wall 18 can be prevented from directly contacting the vehicle occupant. Further, the garnish 20 has a predetermined rigidity and deforms due to a load of a predetermined magnitude or greater being applied thereto from the inner side of the vehicle.

A slip joint 22 is disposed at the vehicle inner side of the garnish 20. The slip joint 22 is formed mainly by a metal plate-shaped member. A vicinity of the lower end portion thereof is covered by a resin member. Further, a slit-shaped hole 22B, through which a webbing 32 which is applied to a vehicle occupant passes, is provided in the vicinity of the lower end portion of the slip joint 22.

A through-hole 22A is formed in the upper end portion of the slip joint 22, and an anchor bolt 26 is inserted therethrough. A head portion 26A of the anchor bolt 26 has a flat head. A step portion 26C, whose diameter is greater than a screw portion 26B, is formed between the screw portion 26B and the head portion 26A. The screw portion 26B and the step portion 26C of the anchor bolt 26 pass through the through-hole 22A formed in the slip joint 22 and a through-hole 20A formed in the garnish 20. The screw portion 26B passes through a through-hole 18A formed in the side wall 18 and a through-hole 24A formed in a reinforcing plate 24 which is fixed to the vehicle outer side of the side wall 18. The screw portion 26B is screwed with a nut 28 provided at the vehicle outer side of the reinforcing plate 24. In this way, the anchor bolt 26 is fixed to the side wall 18, and the slip joint 22 is supported so as to be pivotable around the axis of the anchor bolt 26.

One longitudinal direction end of the webbing 32 is taken-up by a take-up device 34 disposed at the lower portion of the center pillar portion 16. The other end of the webbing 32 is pulled out from the take-up device 34, is inserted through the slit-shaped hole 22B of the slip joint 22, and thereafter, is engaged with a lap outer counter 36 provided at the lower portion of the center pillar portion 16.

Before the other end of the webbing 32 is engaged with the lap outer counter 36, the portion of the webbing 32 positioned between the slip joint 22 and the lap outer counter 36 is inserted through a tongue plate 40. Accordingly, the webbing is set in an applied state by the vehicle occupant sitting in a seat 38 and engaging the tongue plate 40 with a buckle device 44 of a lap inner counter 42 provided at the vehicle inner side of the seat 38.

A slip joint cover 46 is provided at the vehicle inner side of the slip joint 22. The slip joint cover 46 is formed of a resin having a predetermined rigidity, and is formed as a tube shape having a bottom portion 46A or as a substantially hemispherical shape. The edge of the opening of the slip joint cover 46 is fixed to the slip joint 22 with the slip joint cover 46 covering the head portion 26A of the anchor bolt 26 and the peripheral portion of the head portion 26A. A predetermined gap is formed between the bottom portion 46A of the slip joint cover 46 and the head portion 26A of the anchor bolt 26.

A rib 46C serving as a rigidity increasing (strengthening) means is formed at the inner portion of the slip joint cover 46. In the present embodiment, the rib 46C is substantially cylindrical. In the state in which the slip joint cover 46 is mounted to the slip joint 22, the rib 46C extends toward the slip joint 22, and the distal end portion of the rib 46C is separated from the slip joint 22 by a predetermined distance. Accordingly, when the slip joint cover 46 deforms due to pressing force from the inner side of the vehicle, the end portion of the rib 46C at the slip joint 22 side (i.e., the distal end portion of the rib 46C) abuts the slip joint 22 and supports the bottom portion 46A of the slip joint cover 46. In this way, the rigidity in a vicinity of the central portion of the bottom portion 46A is less than the rigidity of the other regions such as a frame portion 46B or the like, and the bottom portion 46A bends in a concave configuration having a predetermined curvature toward the outer side of the vehicle due to the load from the inner side of the vehicle (i.e., the bottom portion 46A bends so as to protrude or be convex toward the vehicle outer side). The rib 46C may be a projecting body. For example, if a plurality of annular ribs 46C are provided, the same operation and effects can be achieved.

A pad portion 46D is formed at a surface of the bottom portion 46A at the slip joint 22 side. The pad portion 46D is thicker than the other regions of the bottom portion 46A, and is formed so as to substantially oppose the head portion 26A of the anchor bolt 26. The pad portion 46D absorbs the load at the time when the slip joint cover 46 bends due to a load from the inner side of the vehicle and the slip joint cover 46 collides with the head portion 26A of the anchor bolt 26, i.e., the pad portion 46D serves as a buffer portion.

Next, operation of the present embodiment will be described.

In the state in which the webbing 32 is applied to a vehicle occupant, when the vehicle 14 suddenly decelerates, the vehicle occupant, with the webbing 32 applied to him or her, may move toward the slip joint 22 due to inertial force, and the head portion H of the vehicle occupant may contact the slip joint cover 46.

In this case, due to the load at the time the head portion H of the vehicle occupant contacts the slip joint cover 46, the slip joint cover 46 bends toward the outer side of the vehicle in a concave configuration (a configuration protruding toward the vehicle outer side), and curves along the head portion H of the vehicle occupant. In this way, the head portion H of the vehicle occupant is received at the entire bottom portion 46A of the slip joint cover 46, and the surface pressure at the time of contact is decreased. Next, when the slip joint cover 46 and the slip joint 22 move from this state along the anchor bolt 26 in a direction of approaching the garnish 20 due to the load, the bottom portion 46A of the slip joint cover 46 collides with the head portion 26A of the anchor bolt 26 (see FIG. 2). Here, because the pad portion 46D is formed at the bottom portion 46A of the slip joint cover 46, the load at the time of the collision is absorbed by the pad portion 46D. Further, when the slip joint 22 moves from this state and collides against the garnish 20, the garnish 20 deforms due to the load at the time of the collision (see FIG. 4). The load at the time the slip joint 22 collides with the garnish 20 is absorbed by the garnish 20 deforming.

As described above, in the shoulder anchor 10 having the above structure, the load at the time that the head portion H of a vehicle occupant contacts the slip joint cover 46 is absorbed by the slip joint cover 46 and the garnish 20. Therefore, the load applied to the head portion H of the vehicle occupant can be effectively decreased. Further, because the load is absorbed by the plural structure of the slip joint cover 46 and the garnish 20, the amount by which the slip joint cover 46 projects toward the inner side of the vehicle can be reduced, and in a usual state, does not create a feeling of a lack of harmony for the vehicle occupant such as a sense of being oppressed or the like.

In the first embodiment, the rigidity is changed at certain portions by forming the rib 46C at the inner portion of the slip joint cover 46. However, in consideration of setting, for example, the magnitude of the gap between the bottom portion 46A of the slip joint cover 46 and the head portion 26A of the anchor bolt 26 and setting the other conditions for absorbing the load, the rigidity of the entire slip joint cover 46 may be made uniform without providing the rib 46C at the slip joint cover 46.

Next, another embodiment of the present invention will be described. Portions which are fundamentally the same as those of the previously-described embodiment are denoted by the same reference numerals, and description thereof is omitted.

Figure 6:
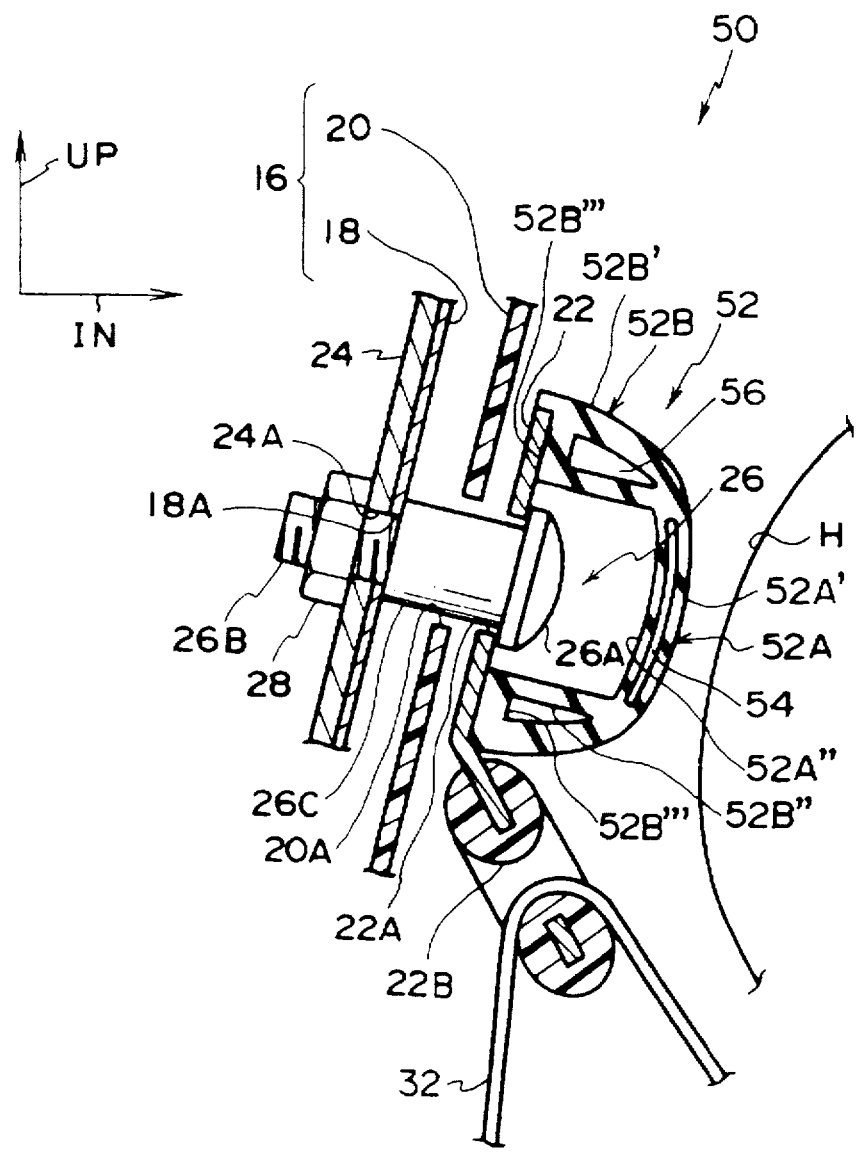
FIG. 6 is a front sectional view illustrating a shoulder anchor relating to a second embodiment.

FIG. 6 is a front sectional view of a shoulder anchor 50 relating to a second embodiment of the present invention.

As illustrated in FIG. 6, in the second embodiment, a slip joint cover 52 is used in place of the slip joint cover 46 used in the first embodiment.

The slip joint cover 52 is formed by a gas injection molding method. A cavity 54 is formed at the inner portion of a bottom portion 52A of the slip joint cover 52, i.e., at the portion substantially opposing the head portion 26A of the anchor bolt 26. Further, a cavity 56 is formed at the inner side of a frame portion 52B of the slip joint cover 52. The slip joint cover 52 will be described in more detail hereinafter.

The bottom portion 52A of the slip joint cover 52 is a double structure. More specifically, the bottom portion 52A includes an outer side portion 52A' positioned at the outer side and an inner side portion 52A" positioned at the inner side. The cavity 54, or a layer of air, is formed between the outer side portion 52A' and the inner side portion 52A". Accordingly, when the bottom portion 52A collides with the head portion 26A of the anchor bolt 26, the outer side portion 52A', the inner side portion 52A" and the cavity 54 act as buffer portions. The frame portion 52B of the slip joint cover 52 includes an outer side portion 52B' which is positioned at the outer side, a cylindrical rib 52B" which is positioned at the inner side, and a donut-shaped circular plate-shaped portion 52B''' which connects the distal end of the rib 52B" and a portion of the outer side portion 52B' in the vicinity of the outer edge portion thereof. The donut-shaped cavity 56 is formed at the interior portion of the frame portion 52B by the outer side portion 52B', the rib 52B", and the donut-shaped circular plate-shaped portion 52B'''. In the state in which the slip joint cover 52 is mounted to the slip joint 22, the donut-shaped circular plate-shaped portion 52B''' is in a state of abutting the vehicle inner side surface of the slip joint 22. Accordingly, the rigidity of the frame portion 52B against pushing force from the direction of the vehicle interior is strengthened by the rib 52B" and the donut-shaped circular plate-shaped portion 52B''' so as to be higher than the rigidity of the bottom portion 52A. As a result, the slip joint cover 52, and mainly the bottom portion 52A, bends in a concave configuration of a predetermined curvature toward the outer side of the vehicle due to pushing force from the inner side of the vehicle.

Figure 7:
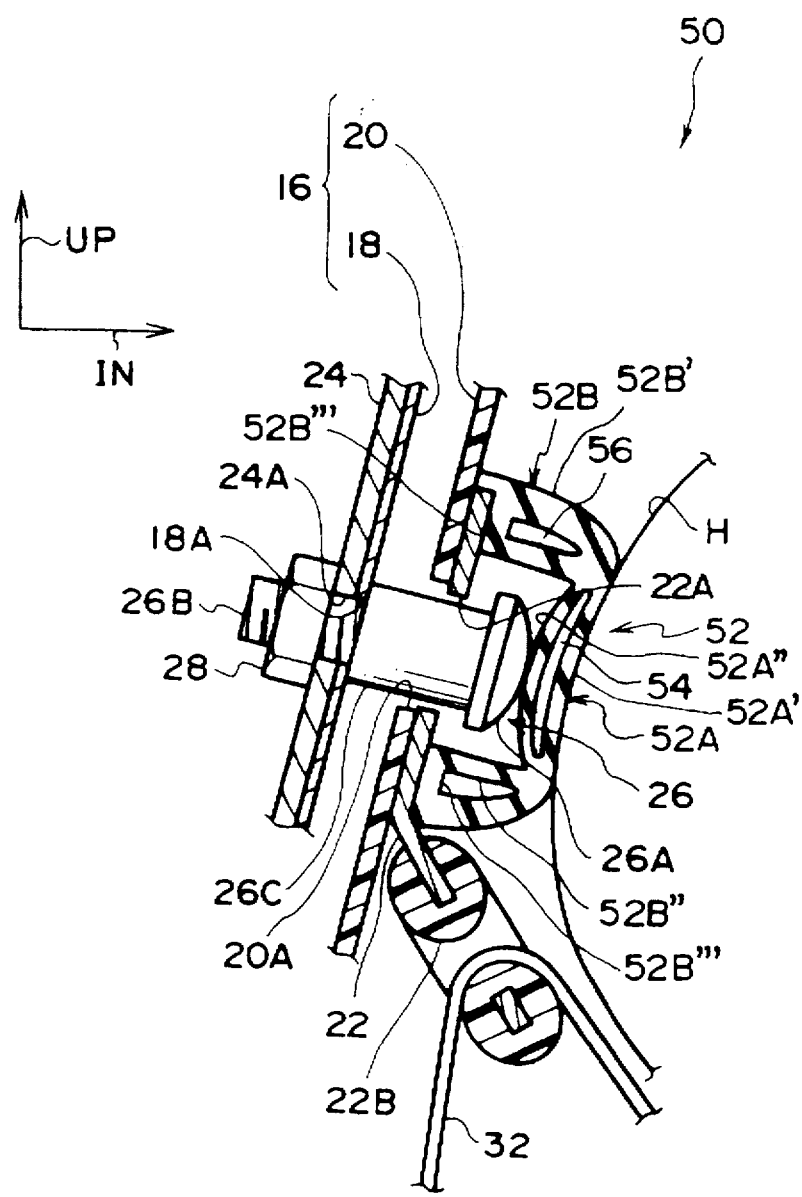
FIG. 7 is a front sectional view corresponding to FIG. 6 and illustrating a state in which the head of a vehicle occupant collides with a slip joint cover.

In this way, when the head portion H of a vehicle occupant contacts the slip joint cover 52, as illustrated in FIG. 7, the slip joint cover 52 bends along the head portion H of the vehicle occupant. The head portion H of the vehicle occupant is received at the entire bottom portion 52A of the slip joint cover 52, and the surface pressure is thereby reduced. Accordingly, in the same way as in the previously-described first embodiment, the load received by the head portion H of the vehicle occupant can be effectively reduced in the second embodiment as well.

In the second embodiment, the cavities 54, 56 are provided in the slip joint cover 52. However, the present invention is not limited to the same. For example, in place of the cavity 54, two or more cavities (layers of air) may be formed along the direction of thickness of the bottom portion 52A, i.e., the bottom portion 52A can be formed in three or more layers. Further, with regard to the cavity 56, for example, ribs may be provided therein so as to partition the donut-shaped cavity into a plurality of cavities along the circumferential direction thereof. A structure suffices as long as the rigidity of a vicinity of the central portion of the bottom portion 52A against force pushing the slip joint cover 52 from the direction of the vehicle interior is, due to the provision of the cavities, set to be lower than the rigidity of the other regions of the slip joint cover 52, i.e., as long as the rigidity of the frame portion 52B against force pushing the slip joint cover 52 from the direction of the vehicle interior is higher than that of a vicinity of the central portion of the bottom portion 52A. For example, a structure may be provided in which the cavity 54 and the cavity 56 are connected by very small holes. In these cases as well, the same effects as those described above can be obtained.

A shoulder anchor 60 relating to a third embodiment of the present invention will be described hereinafter with reference to FIGS. 8 and 9.

Figure 8:
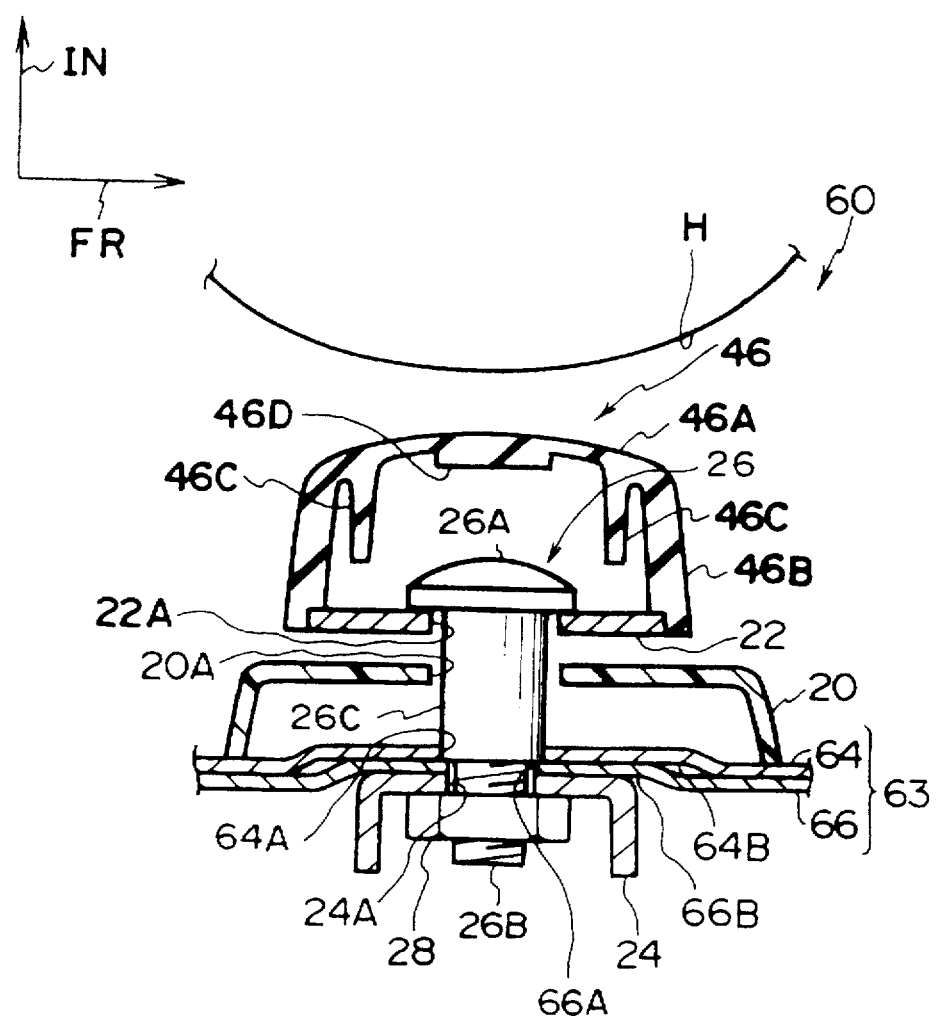
FIG. 8 is a top sectional view illustrating a shoulder anchor relating to a third embodiment of the present invention.
Figure 9:
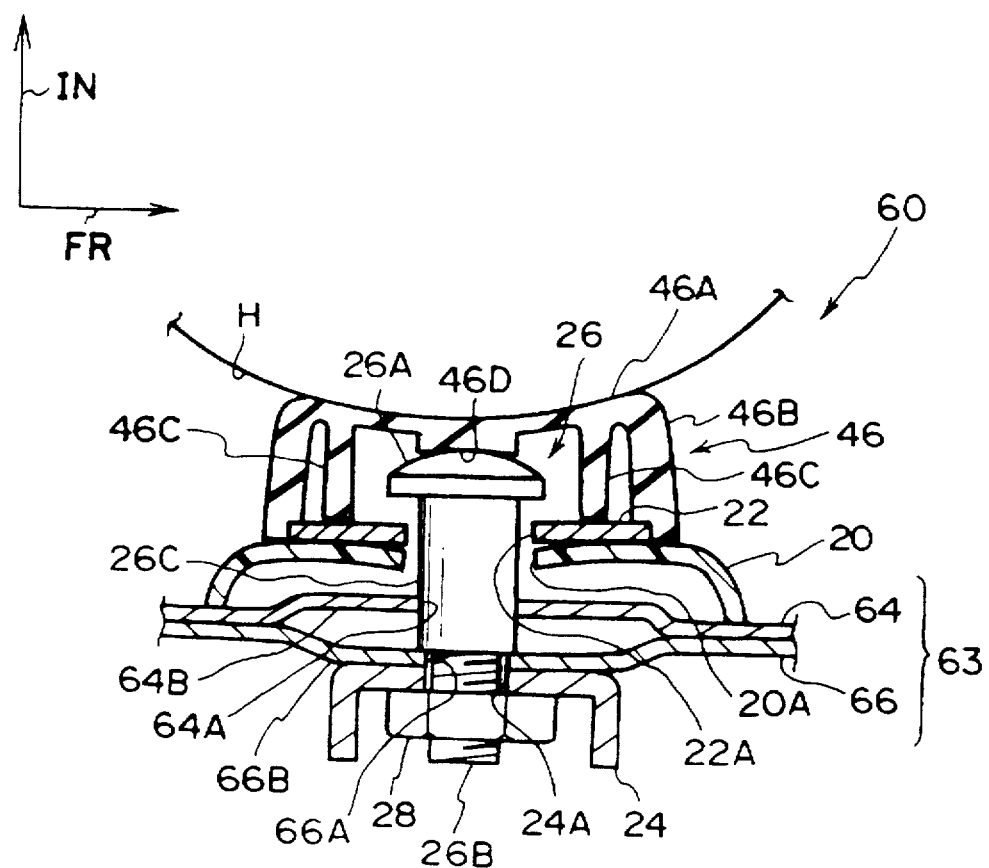
FIG. 9 is a top sectional view corresponding to FIG. 8 and illustrating a state in which the head of a vehicle occupant collides with a slip joint cover.

As illustrated in FIG. 8, in the shoulder anchor 60, a side wall 63 is formed by an inner plate 64 and an outer plate 66. A through-hole 64A is formed in the inner plate 64. The through-hole 64A is of a size which allows the step portion 26C of the anchor bolt 26 to be inserted therethrough. A convex portion 64B, which is bent toward the inner side of the vehicle in a convex configuration in cross-section, is formed in a vicinity of the portion of the inner plate 64 in which the through-hole 64A is formed.

The outer plate 66 is disposed so as to be fit closely to the inner plate 64 at the vehicle outer side of the inner plate 64. A convex portion 66B, which corresponds to the convex portion 64B of the inner plate 64 and is bent in a convex configuration toward the inner side of the vehicle, is formed at the outer plate 66. A through-hole 66A corresponding to the through-hole 64A is formed in the convex portion 66B. The through-hole 66A is of a size such that the screw portion 26B of the anchor bolt 26 can pass therethrough and the end surface of the step portion 26C abuts the edge portion of the through-hole 66A of the convex portion 66B. The reinforcing plate 24 is fixed to the vehicle outer side of the outer plate 66. The through-hole 24A of approximately the same size as the through-hole 66A of the outer plate 66 is formed in the reinforcing plate 24 so as to correspond to the through-hole 66A. Accordingly, the anchor bolt 26 is inserted into the through holes 64A, 66A and 24A from the inner side of the vehicle such that the step portion 26C of the anchor bolt 26 passes through the through-hole 64A of the inner plate 64, the end surface of the step portion 26C abuts the edge portion of the through-hole 66A of the outer plate 66, and the screw portion 26B passes through the through hole 66A of the outer plate 66 and the through hole 24A of the reinforcing plate 24. In the state in which the anchor bolt 26 is inserted into the through holes 64A, 66A and 24A, the nut 28 is screwed with the screw portion 26B from the vehicle outer side of the reinforcing plate 24 so that the anchor bolt 26 is fixed to the outer plate 66 and the reinforcing plate 24.

In the shoulder anchor 60 having the above-described structure, when the head portion H of a vehicle occupant contacts the slip Joint cover 46 due to the inertial force at the time the vehicle suddenly decelerates, the load received by the head portion H of the vehicle occupant is reduced by the same operation as in the first embodiment. Further, when the pad portion 46D of the slip joint cover 46 collides with the head portion 26A of the anchor bolt 26, the outer plate 66 is pushed toward the outer side of the vehicle by the anchor bolt 26, and the outer plate 66 deforms in a convex shape toward the vehicle exterior due to the load.

Here, the load which the outer plate 66 receives from the anchor bolt 26 is absorbed due to the outer plate 66 deforming. As a result, the load which the head portion H of the vehicle occupant receives from the anchor bolt 26 via the pad portion 46D (the slip joint cover 46) can be effectively reduced. Further, because the load is absorbed by the side wall 63 (the outer plate 64) in addition to the slip joint cover 46 and the garnish, the amount of protrusion of the slip joint cover 46 toward the inner side of the vehicle can be reduced even more. Therefore, it is clear that a structure, in which the side wall is formed by the inner plate and the outer plate and the outer plate is deformed in a convex shape toward the exterior of the vehicle due to a load or a pushing force, may be applied to the first embodiment and other embodiments as well.

Next, a fourth embodiment of the present invention will be described.

Figure 10:
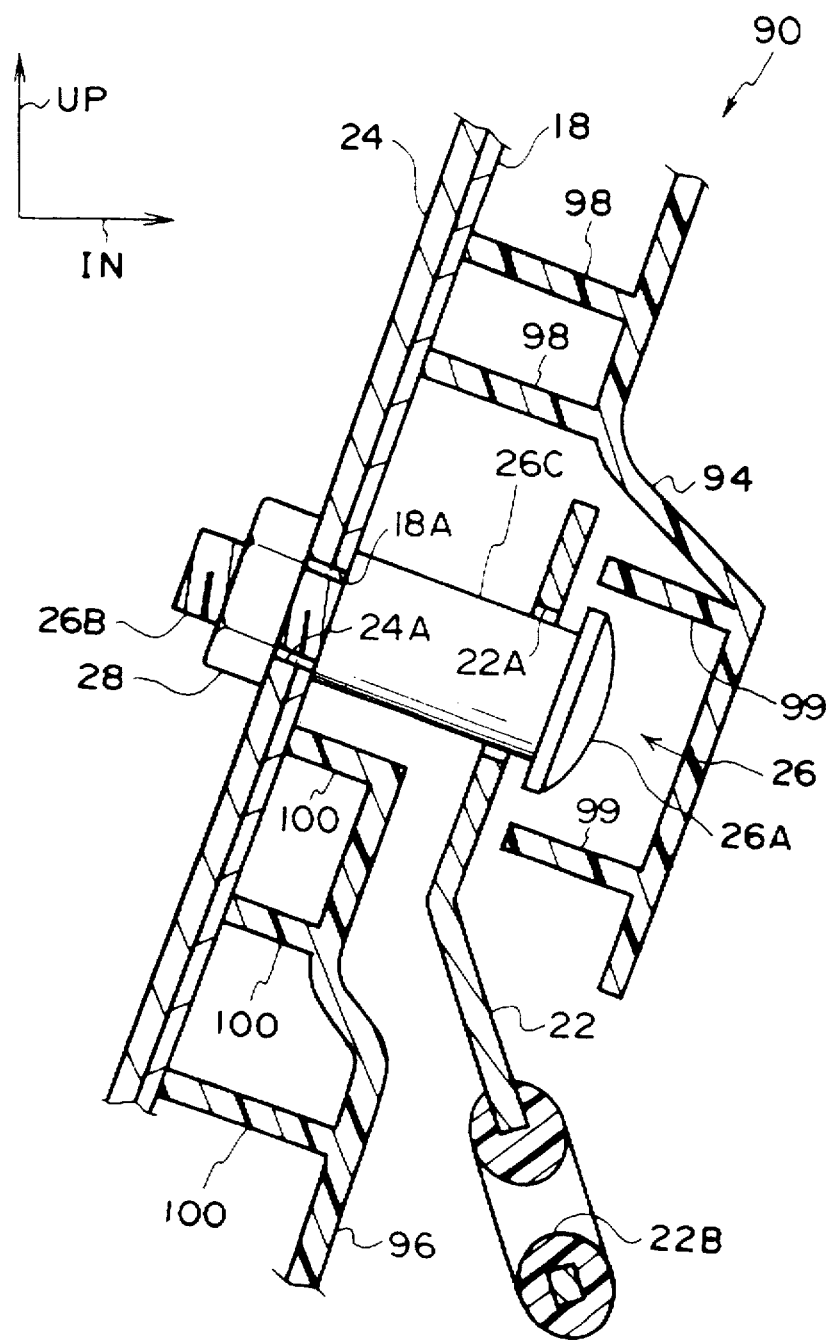
FIG. 10 is a front sectional view illustrating a shoulder anchor relating to a fourth embodiment of the present invention.

FIG. 10 is a front sectional view of a shoulder anchor 90 relating to the fourth embodiment. As can be seen in FIG. 10, in a shoulder anchor 90, a garnish upper 94 and a garnish lower 96 are provided at the vehicle inner side of the side wall 18. The garnish upper 94 is formed by a resin material such as polyvinyl chloride or the like having a predetermined rigidity, and is provided at the center pillar portion 16 of the vehicle 14 further toward the top of the vehicle than a heightwise direction intermediate portion of the center pillar portion 16. A predetermined gap is formed between the garnish upper 94 and the side wall 18. A plurality of ribs 98, which deform due to load from an inner side of the vehicle, project from the side wall 18 side surface of the garnish upper 94 toward the side wall 18 such that the distal end portions of the ribs 98 abut the side wall 18.

The lower end portion of the garnish upper 94 is bent toward the inner side of the vehicle. At the vehicle outer side of this lower end portion of the garnish upper 94 (i.e., between the garnish upper 94 and the side wall 18), the slip joint 22 is supported by the anchor bolt 26 which is fixed to the side wall 18 and the reinforcing plate 24. A predetermined gap is formed between the head portion 26A of the anchor bolt 26 and the garnish upper 94. More specifically, the head portion 26A of the anchor bolt 26 is covered by the garnish upper 94 with a predetermined gap being formed between the head portion 26A and the garnish upper 94. Further, a plurality of ribs 99 project from the lower end portion of the garnish upper 94 toward the slip joint 22. The ribs 99 are positioned at the sides of the head portion 26A of the anchor bolt 26.

The garnish lower 96 is formed of a resin material such as polyvinyl chloride having a predetermined rigidity, which is the same as the material of the garnish upper 94. The garnish lower 96 is provided from a region at the vehicle lower side of the anchor bolt 26 between the slip joint 22 and the side wall 18. A predetermined gap is formed between the garnish lower 96 and the side wall 18. Further, a plurality of ribs 100, which deform due to load from the inner side of the vehicle, project from the side wall 18 side surface of the garnish lower 96 toward the side wall 18 such that the distal end portions of the ribs 100 abut the side wall 18.

At the above-described shoulder anchor 90, when the body of a vehicle occupant contacts the garnish upper 94 and the lower end portion thereof in particular, due to this load, the garnish upper 94 deforms and the ribs 98 deform. Here, the load at the time the body of the vehicle occupant contacts the garnish upper 94 is absorbed by the garnish upper 94 and the ribs 98 due to the garnish upper 94 and the ribs 98 deforming. Next, when the ribs 99 push the slip joint 22 due to this load, the slip joint 22 moves toward the garnish lower 96 and collides with the garnish lower 96. The garnish lower 96 thereby deforms, and the ribs 100 deform. Here, the load at the time the slip joint 22 collides with the garnish lower 96 is absorbed by the garnish lower 96 and the ribs 100 due to the garnish lower 96 and the ribs 100 deforming. Namely, the load in a case in which the body of the vehicle occupant contacts the garnish upper 94 is absorbed by the garnish upper 94 and the ribs 98. The load in a case in which the slip joint 22, which is pushed by the ribs 99 of the lower end portion of the garnish upper 94, collides with the garnish lower 96 is absorbed by the garnish lower 96 and the ribs 100. Therefore, loads applied to the body of the vehicle occupant can be effectively reduced.

In this way, because loads are absorbed by a plurality of structures which are the garnish upper 94, the garnish lower 96, and the ribs 98, 100, the gap between the garnish upper 94 and the side wall 18 and the gap between the garnish lower 96 and the side wall 18 can be reduced without a deterioration in the load absorption effect.

Next, a fifth embodiment of the present invention will be described.

Figure 11:
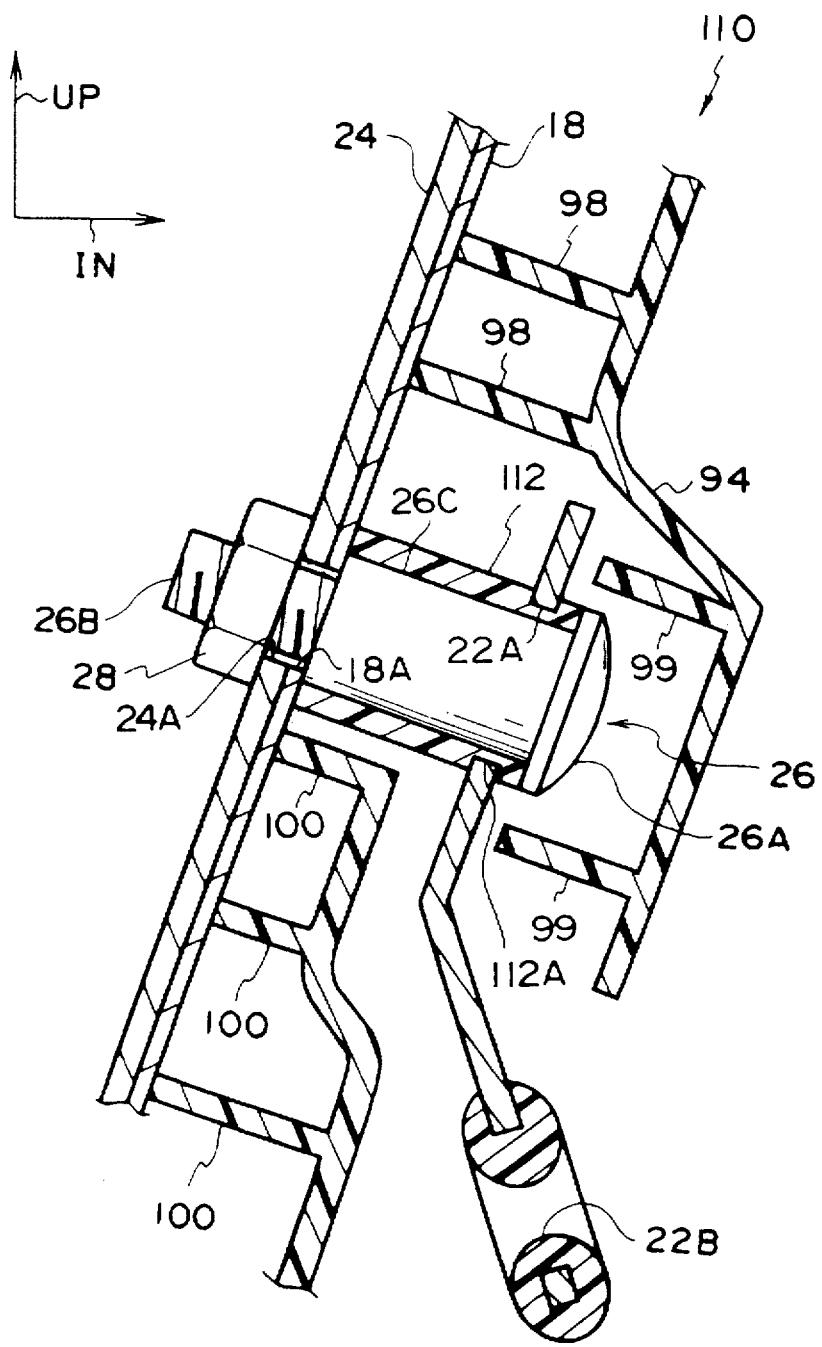
FIG. 11 is a front sectional view illustrating a shoulder anchor relating to a fifth embodiment of the present invention.

FIG. 11 is a front sectional view of a shoulder anchor 110 relating to the fifth embodiment. As illustrated in FIG. 11, in the shoulder anchor 110, a sleeve 112 is provided at the shoulder anchor 90 of the fourth embodiment. The sleeve 112 is formed of a resin material having a predetermined rigidity. The anchor bolt 26 is inserted in the sleeve 112 such that the sleeve 112 is positioned around the step portion 26C of the anchor bolt 26. One longitudinal direction end surface of the sleeve 112 abuts the side wall 18, whereas the other longitudinal direction end surface abuts the reverse surface of the head portion 26A of the anchor bolt 26. An annular groove 112A, which runs along the peripheral direction of the sleeve 112, is formed in a vicinity of the vehicle inner side end portion of the sleeve 112. The outer diameter of the bottom portion of the groove 112A of the sleeve 112 corresponds to the inner diameter of the through-hole 22A of the slip joint 22. When the slip joint 22 is fit onto the groove 112A, in a usual state, the slip joint 22 is rotated along the groove 112A, and the slip joint 22 is maintained by the sleeve 112 at a predetermined position in the longitudinal direction of the sleeve 112.

In the shoulder anchor 110 having the above-described structure, load is absorbed by the same operation as with the shoulder anchor 90. Further, when the body of the vehicle occupant contacts the garnish upper 94 and the ribs 99 push the slip joint 22, the sleeve 112 is pushed toward the outer side of the vehicle due to the load from the slip joint 22, and the sleeve 112 deforms. Here, the load at the time the slip joint 22 pushes the sleeve 112 is absorbed by the sleeve 112 due to the sleeve 112 deforming. Therefore, the load which the body of the vehicle occupant receives at the time his/her body contacts the garnish upper 94 can be reduced even more effectively.

In the fifth embodiment, the sleeve 112 is provided at the shoulder anchor 90 of the fourth embodiment. However, the present invention is not limited to the same, and the sleeve 112 can be applied to others of the above-described embodiments. In this case, because the effect of the absorption of load by the sleeve 112 is added to the effects of the embodiment to which the sleeve 112 is applied, the load acting on the body of the vehicle occupant (the head portion H of the vehicle occupant) can be reduced even more effectively.

What is claimed is:

1. A shoulder anchor structure having: a slip joint disposed at a vehicle inner side of a side wall of a vehicle, and supporting a longitudinal direction intermediate portion of a webbing for restraining a vehicle occupant; and an anchor bolt having an axis of rotation, and being fixed to the side wall in a state of passing through said slip joint, and supporting said slip joint, said shoulder anchor structure comprising:

a slip joint cover fixed to said slip joint with a predetermined gap being formed between said slip joint cover and a vehicle inner side direction end portion of said anchor bolt so as to cover at least the vehicle inner side direction end portion of said anchor bolt, said slip joint cover deforming due to an axially-oriented load from a vehicle inner side so as to absorb the load; and a garnish disposed between the side wall and said slip joint with a predetermined gap being formed between said garnish and the side wall, said garnish deforming due to an axially-oriented load from said slip joint so as to absorb the load, wherein respective rigidities, with respect to a pushing force from the vehicle inner side, of a first region of said slip joint cover, which substantially opposes the vehicle inner side direction end portion of said anchor bolt, and a second region of said slip joint cover, which is provided at a periphery of said first region, are lower than rigidities of other regions of said slip joint cover, said first region and said section region curving toward the vehicle outer side in a concave configuration in response to said load from the vehicle inner side.

2. A shoulder anchor structure according to claim 1, wherein said slip joint cover has a rigidity increasing means for increasing rigidity with respect to said load from the vehicle inner side in a case in which said slip joint cover receives a load of a predetermined value or greater from the vehicle inner side.

3. A shoulder anchor structure according to claim 2, wherein said rigidity increasing means is a rib which projects toward said slip joint from a surface of said slip joint cover opposing said slip joint.

4. A shoulder anchor structure according to claim 3, wherein said rigidity of said slip joint cover with respect to load from the vehicle inner side is increased by a distal end portion of said rib abutting said slip joint in a case in which said slip joint cover receives said load of a predetermined value or greater from the vehicle inner side.

5. A shoulder anchor structure according to claim 3, wherein said rib is a substantially cylindrical rib, and said rigidity of said slip joint cover is increased due to a distal end portion of said substantially cylindrical rib abutting said slip joint in a vicinity of said anchor bolt such that the vehicle inner side direction end portion of said anchor bolt is positioned within said substantially cylindrical rib in a case in which said slip joint cover receives said load of a predetermined value or greater from the vehicle inner side.

6. A shoulder anchor structure according to claim 1, wherein said slip joint cover has a rigidity increasing means for increasing rigidity with respect to said load from the vehicle inner side by deforming a predetermined amount in a direction of said slip joint.

7. A shoulder anchor structure according to claim 6, wherein said rigidity increasing means has a rib which abuts said slip joint due to said slip joint cover deforming a predetermined amount in the direction of said slip joint, and rigidity of said slip joint cover with respect to said load from the vehicle inner side is increased by said rib abutting said slip joint.

8. A shoulder anchor structure according to claim 7, wherein said rib is a substantially cylindrical rib, and the rigidity of said slip joint cover is increased due to a distal end portion of said substantially cylindrical rib abutting said slip joint in a vicinity of said anchor bolt such that the vehicle inner side direction end portion of said anchor bolt is positioned within said substantially cylindrical rib.

9. A shoulder anchor structure according to claim 1, wherein a fixed portion of the side wall is deformable, and the fixed portion deforms due to a load from said anchor bolt such that the side wall absorbs the load.

10. A shoulder anchor structure according to claim 1, wherein a first region of said slip joint cover which substantially opposes the vehicle inner side direction end portion of said anchor bolt is thicker than a second region of said slip joint cover which is positioned at an outer side of said first region.

11. A shoulder anchor structure according to claim 10, wherein said first region is formed in two layers which sandwich an air layer.

12. A shoulder anchor structure according to claim 1, further comprising:

a sleeve into which said anchor bolt is inserted such that said sleeve is positioned at a periphery of said anchor bolt, and said sleeve holds said slip joint at a predetermined position in an ordinary state, and said sleeve is deformed by said load from said slip joint so as to absorb the load.

13. A shoulder anchor structure according to claim 2, further comprising:

a sleeve into which said anchor bolt is inserted such that said sleeve is positioned at a periphery of said anchor bolt, and said sleeve holds said slip joint at a predetermined position in an ordinary state, and said sleeve is deformed by said load from said slip joint so as to absorb the load.

14. A shoulder anchor structure according to claim 1, wherein said first region is formed in two layers which sandwich an air layer.

15. A shoulder anchor structure according to claim 1, wherein said first region is thicker than said second region.

16. A shoulder anchor structure according to claim 1, wherein the rigidities of said other regions are set higher than the rigidities of said first region and said second region due to a rib which extends toward said slip joint and abuts said slip joint.

17. A shoulder anchor structure according to claim 16, wherein a distal end portion of said rib and an outer peripheral portion of said slip joint cover are connected.

18. A shoulder anchor structure according to claim 16, wherein said rib is a cylindrical rib, and an entire periphery of a distal end portion of said cylindrical rib is connected to an entire periphery of an outer peripheral portion of said slip joint cover by a donut-shaped plate portion.

19. A shoulder anchor structure according to claim 1, wherein a fixed portion of the side wall is deformable, and the fixed portion deforms due to a load from said anchor bolt such that the side wall absorbs the load.

20. A shoulder anchor structure according to claim 1, further comprising:
a sleeve into which said anchor bolt is inserted such that said sleeve is positioned at a periphery of said anchor bolt, and said sleeve holds said slip joint at a predetermined position in an ordinary state, and said sleeve is deformed by said load from said slip joint so as to absorb the load.

21. A shoulder anchor structure having: a slip joint disposed at a vehicle inner side of a side wall of a vehicle, and supporting a longitudinal direction intermediate portion of a webbing for restraining a vehicle occupant; and an anchor bolt having an axis of rotation, and being fixed to the side wall in a state of passing through said slip joint, and supporting said slip joint, said shoulder anchor structure comprising:
a slip joint cover fixed to said slip joint with a predetermined gap being formed between said slip joint cover and a vehicle inner side direction end portion of said anchor bolt so as to cover at least the vehicle inner side direction end portion of said anchor bolt, said slip joint cover deforming due to an axially-oriented load from a vehicle inner side so as to absorb the load; and
a garnish disposed between the side wall and said slip joint with a predetermined gap being formed between said garnish and the side wall, said garnish deforming due to an axially-oriented load from said slip joint so as to absorb the load,
wherein all of the axially-oriented load applied to the slip joint cover is first absorbed exclusively by said slip joint cover and then exclusively by the combination of said slip joint cover and said garnish before being applied to said fixed bolt.

22. A shoulder anchor structure having: a slip joint disposed at a vehicle inner side of a side wall of a vehicle, and supporting a longitudinal direction intermediate portion of a webbing for restraining a vehicle occupant; and an anchor bolt fixed to the side wall in a state of passing through said slip joint, and supporting said slip joint, said shoulder anchor structure comprising:
a garnish upper at which at least one rib extending in a direction of opposing the side wall is formed, said garnish upper covering a vehicle inner side direction end portion of said anchor bolt from an upper side of a vehicle with a predetermined gap being formed between the vehicle inner side direction end portion of said anchor bolt and said garnish upper, and said garnish upper deforming due to load from a vehicle inner side so as to absorb the load; and
a garnish lower at which at least one rib extending in a direction of opposing the side wall is formed, said garnish lower being disposed such that at least one portion of said garnish lower is positioned between said slip joint and the side wall from a vehicle lower side of said anchor bolt with a predetermined gap being formed between the side wall and said garnish lower, and said garnish lower deforming due to load from the vehicle inner side so as to absorb the load.

23. A shoulder anchor structure according to claim 22, wherein a fixed portion of the side wall is deformable, and the fixed portion deforms due to load from said anchor bolt such that the side wall absorbs the load.

24. A shoulder anchor structure according to claim 22, further comprising:
a sleeve into which said anchor bolt is inserted such that said sleeve is positioned at a periphery of said anchor bolt, and said sleeve holds said slip joint at a predetermined position in an ordinary state, and said sleeve is deformed by load from said slip joint so as to absorb the load.

25. A shoulder anchor structure according to claim 23, further comprising:
a sleeve into which said anchor bolt is inserted such that said sleeve is positioned at a periphery of said anchor bolt, and said sleeve holds said slip joint at a predetermined position in an ordinary state, and said sleeve is deformed by load from said slip joint so as to absorb the load.

26. A shoulder anchor structure according to claim 22, wherein the at least one rib of said garnish upper and the at least one rib of said garnish lower abut the side wall.

* * * * *